O. G. SIMMONS.
FORMED MILLING CUTTER.
APPLICATION FILED JULY 17, 1916.
1,221,613.
Patented Apr. 3, 1917.
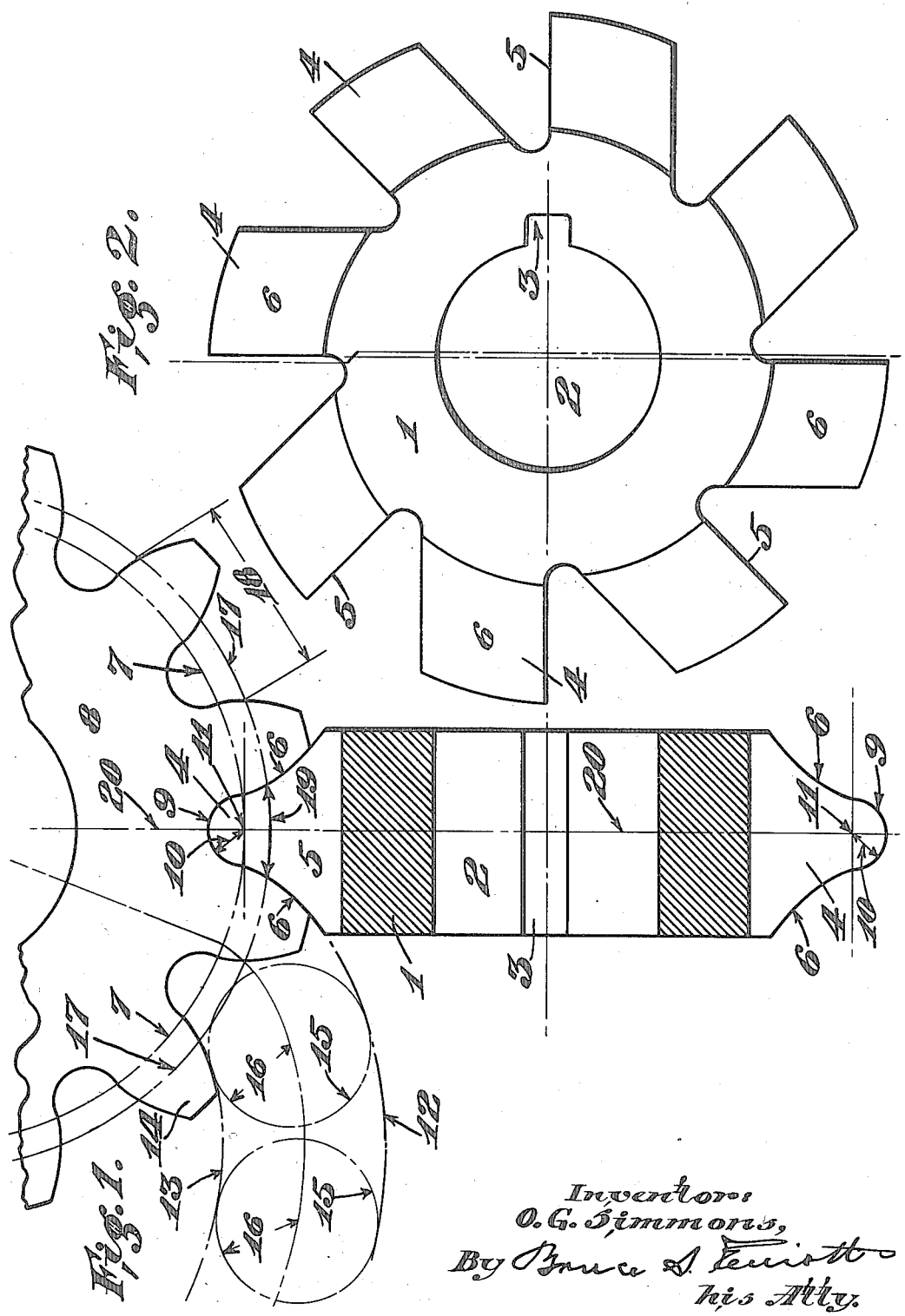

UNITED STATES PATENT OFFICE.

OLIVER G. SIMMONS, OF DETROIT, MICHIGAN.

FORMED MILLING-CUTTER.

1,221,613.
Specification of Letters Patent.
Patented Apr. 3, 1917.

Application filed July 17, 1916. Serial No. 109,624.

*To all whom it may concern:*

Be it known that I, OLIVER G. SIMMONS, a citizen of the United States, residing in Detroit, in the county of Wayne and State of Michigan, have invented new and useful Improvements in Formed Milling-Cutters, of which the following is a specification.

This invention relates to a formed milling, or rotary cutter, which is adapted to be secured to an arbor or mandrel of a milling machine, or of other machines adapted for the purpose, for milling the teeth of gear wheels whereby to produce a gear wheel having teeth with true involute-curved surfaces.

An object of the invention is to so form the curves of the cutter as to produce a gear the teeth of which will mate properly with similar teeth produced or formed in the mating gear by another method, or by a different principle of operation.

A further object of the invention is to provide a cutter with true generated, involute curves, the lead of each of said curves being substantially equal to the perimeter of the base circle of the gear being cut.

A still further object of the invention is to provide a cutter having teeth, the opposite sides or cutting edges of which are in the form of true involute curves of opposite hand and the outer ends of which provide circular cutting portions for forming root clearances between the teeth of the gear, the curve of each of said circular cutting surfaces connecting the involute curves of its tooth.

Other objects and purposes of the invention will more clearly appear from the detailed description to follow.

In the accompanying drawing,—

Figure 1 is a sectional view of my improved cutter as it would appear when cutting a twelve tooth gear of 2 diametral pitch, a portion of such gear being shown in side elevation; and Fig. 2 is a view in side elevation of the cutter.

Referring now to the drawing, the numeral 1 indicates the body of the cutter, which is provided with the usual bore 2 for receiving an arbor or mandrel to which it is adapted to be secured by means of a key, the groove for which latter is indicated by the numeral 3. The numeral 4 indicates the teeth of the cutter, said teeth being backed off in the usual way to provide clearance for the cutting faces 5. The numeral 6 indicates the sides of the teeth 4, which sides are curved to have the form of true involute curves, which latter have a lead substantially equal to the perimeter of the base circle 7 of the gear 8, shown in Fig. 1. The involute-curved faces 6 of each tooth of the cutter 1 are joined by the curved line 9 which defines a circular or arcuate cutting surface for forming a clearance space at the roots of adjacent teeth, the curve 9 having a radius 10 whose center will lie upon the base circle 7 of the gear, as indicated by the numeral 11. It should be explained that the curved cutting edges of the teeth will be of an extent to cut to the base circle of the gear only in the case of the twelve-tooth gear shown, which may be conveniently referred to as the "base" gear, by which term is meant the smallest gear of any given system. In the case of gears having a larger number of teeth, the cutter will only extend to the "root" circle, which is an imaginary circle located the same distance from the pitch circle in larger gears as the base circle is from the pitch circle in the base gear. The fact that in gears larger than the base gear the curve of the teeth should not extend to the base circle, by reason of the excessive length of tooth that would result is well understood to those skilled in the art. In the base gear, however, the base circle and root circle are identical. In larger gears than the base gear, therefore, the center of the radius 10 will lie upon the root circle and not the base circle. It is convenient to use the base circle of the gear 8 as a basis for defining the nature and character of the curves of the teeth of the cutter, as the gear in the portion cut is the necessary complement of the teeth of the cutter, and with the latter in position between two teeth of the gear, as shown by Fig. 1, it is obvious that the base circle of the gear serves equally well as a basis for defining the curve of the teeth of the cutter as for those of the gear itself.

If one of the involute curves forming the faces 6 of the cutter 1 were to be extended, as shown in Fig. 1, and indicated by the numeral 12, and if the involute curve 13 were extended from the tooth 14 of the gear 8, these involute curves would be parallel, as shown by the circles 15 having equal radii 16.

The numeral 17, Fig. 1, indicates the pitch circle of the gear 8 and the measure 18 of the pitch circle indicates the circular pitch of said gear. Since it is usual in practice to have the thickness of the tooth, measured on the pitch line, equal to one-half its circular pitch, such proportion is preserved in the present case. It will be apparent, therefore, that the measure 19 of the teeth 4 of the cutter 1 will equal one-half the circular pitch as measured on the pitch circle. The median line 20 of the cutter 1 bisects the involute curves of the faces 6 of said cutter. The center 11 of the radius 10 will therefore lie upon this median line 20.

The lead (i. e., the distance between spires) of the involute curves 6 of the teeth of the cutter above referred to follows from the law of the involute curve as fully set forth in my pending application, Ser. No. 93,675, filed April 26th, 1916, for a method of generating involute curves, said law being stated as follows:

The involute of any evolute has a constant lead when measured on a line tangent to said evolute, and is equal to the perimeter of the generating evolute.

The involute curves 6 of the cutter 1 will be formed according to this law, and said curves will form the whole of the cutting points of said cutter except the circular cutting portion bounded by the curve 9, which latter joins the involute curves. In other words, the involute curved cutting edges of the cutter will form tooth-contacting surfaces in the form of involute curves extending from the periphery of the gear to the base, or root circle thereof, and the curved cutting portion 9 will form in the gear a circular space the curve of which will lie wholly below the base, or root circle and will connect the opposite curved surfaces of adjacent teeth at the base, or root circle of the gear. The object of providing the circular cutting portion 9 is to obtain the necessary clearance at the root of the teeth without the usual sacrifice of strength and tooth-contacting surface. A gear formed by my improved cutter will run silently at high speeds, roll perfectly and uniformly at every point of its motion, will have no frictional wear at all on the tooth surfaces, and the gear teeth will be stronger than any other gear teeth heretofore proposed or made, size for size, so far as my knowledge of gears extends. The latter characteristic is due primarily to the utilization of the entire surface of the teeth above the base, or root circle for the purpose of contact with the teeth of the mating gear, and the provision of the clearance space produced by the cutting surface 9, which clearance space is in the form of a curve of a circle and is preferably semi-circular. Such clearance space, is adequate for clearance purposes, and at the same time does not involve an unnecessary sacrifice of the metal of the body of the gear with the resultant weakening of the teeth.

The statement made above that a gear made by my improved cutter will run without frictional wear on the tooth surface must be understood as applying only to gears of an equal number of teeth. Where the number of teeth are unequal there will be a certain amount of friction, increasing according to the increase in size of the gear as compared with the base gear, which is a condition well recognized by those skilled in the art and is inherent in the nature of the case where the same pressure angle is maintained for gears of different size.

In addition to the above characteristics the teeth of my improved cutter will preferably be based upon a pressure angle of $22\frac{1}{2}$ degrees and have an addendum equal to a $\frac{4}{5}$ module.

In a pending application, Ser. No. 97,530, filed May 15th, 1916, I have fully set forth the advantages of a gear such as would be produced by a cutter constructed according to the present invention, and it seems unnecessary to repeat such matter in the present case. It is sufficient to state, therefore, that my improved cutter is designed to produce a gear having all of the merits set forth with reference to the gear described and illustrated in my said pending application. Furthermore, I have shown in said application that the lead of the involute curve i. e., the perimeter of the base circle of the gear, is very great as compared with the small part of the curve which is used to form one side of the tooth of the gear, and that variations from this lead to a considerable extent, one way or the other, will be possible without departing from the practical accuracy of the tooth curve. The same is true with respect to the involute-curved surfaces of my improved cutter herein described, and variations from the lead of the curves of the cutter, which lead would theoretically be equal to the perimeter of the base circle 7 of the gear to be cut, may be made without departing from the practical accuracy of the curved surfaces of the teeth cut thereby.

I claim:

1. A rotary gear cutter having the cutting surfaces of its teeth in the form of true involute curves of an extent at least equal to the depth of the teeth to be cut when measured from the periphery of the gear to its root circle, and with a lead substantially equal to the perimeter of the imaginary base circle of the gear to be cut.

2. A rotary gear cutter having teeth, each of which is provided with cutting surfaces in the form of true involute curves of an extent at least equal to the depth of the teeth to be cut when measured from the periphery of the gear to its root circle, and with a circular cutting surface, the curve of which connects the curves of said involute-curved cutting surfaces.

3. A rotary gear cutter having teeth, each of which is provided with cutting surfaces in the form of true involute curves of an extent at least equal to the depth of the teeth to be cut when measured from the periphery of the gear to its root circle, and with a circular cutting surface, the curve of which connects the curves of said involute-curved cutting surfaces, said involute curves of the teeth being based upon a pressure angle of 22½ degrees.

4. A rotary gear cutter having teeth, each of which is provided with cutting surfaces in the form of true involute curves, each curve having a lead substantially equal to the perimeter of the corresponding imaginary base circle of the gear to be cut.

5. A rotary gear cutter having teeth, each of which is provided with cutting surfaces in the form of involute curves, each curve having a lead substantially equal to the perimeter of the corresponding base circle of the gear to be cut and having an extent at least equal to the depth of the teeth to be cut when measured from the periphery of the gear to its root circle.

6. A rotary gear cutter having teeth, each of which is provided with cutting surfaces in the form of involute curves, each curve having a lead substantially equal to the perimeter of the corresponding base circle of the gear to be cut and of an extent at least equal to the depth of the teeth to be cut when measured from the periphery of the gear to its root circle, and with a circular cutting surface, the curve of which joins the curves of said involute-curved cutting surfaces.

7. A rotary gear cutter having teeth each of which is provided with side cutting surfaces in the form of involute curves and a substantially semi-circular end cutting surface, the curve of which connects the involute curves of said side cutting surfaces.

In testimony whereof, I have hereunto set my hand.

OLIVER G. SIMMONS.